US006948396B2

(12) United States Patent
Stevenson

(10) Patent No.: US 6,948,396 B2
(45) Date of Patent: Sep. 27, 2005

(54) CONTROL APPARATUS FOR A MULTI-SPEED TRANSMISSION

(75) Inventor: Paul D. Stevenson, Ann Arbor, MI (US)

(73) Assignee: General Motors Corporation, Detroit, MI (US)

( * ) Notice: Subject to any disclaimer, the term of this patent is extended or adjusted under 35 U.S.C. 154(b) by 69 days.

(21) Appl. No.: 10/738,564

(22) Filed: Dec. 17, 2003

(65) Prior Publication Data

US 2005/0137045 A1    Jun. 23, 2005

(51) Int. Cl.[7] .............................................. F16H 59/00
(52) U.S. Cl. ..................... 74/335; 475/149
(58) Field of Search ................ 74/335, 337.5; 475/149, 154

(56) References Cited

U.S. PATENT DOCUMENTS 5,078,249 A  *  1/1992  Botterill ................... 192/93 A

* cited by examiner

Primary Examiner—Dirk Wright
(74) Attorney, Agent, or Firm—Leslie C. Hodges

(57) ABSTRACT

A power transmission employs a plurality of torque-to-thrust apparatus to control the engagement and disengagement of the transmission ratios. Each of the torque-to-thrust apparatus is operatively connectible with a pair of electric motors, which are individually operable to control the operation of the torque-to-thrust apparatus. During transmission operation, one of the electric motors is operable to disengage a friction device within the transmission while the other electric motor is operable to engage a different friction device within the transmission, thus permitting controlled ratio upshifts and downshifts.

5 Claims, 2 Drawing Sheets

CONTROL APPARATUS FOR A MULTI-SPEED TRANSMISSION

TECHNICAL FIELD

This invention relates to control apparatus for power transmissions and, more particularly, to control apparatus employing torque-to-thrust control mechanisms.

BACKGROUND OF THE INVENTION

Prior art automatic power transmissions generally include control apparatus having a hydraulic power source in valve mechanisms for controlling a plurality of friction devices that are applied by hydraulic power to associated pistons. While these control apparatus work quite well and have been very successful over the years, they do require the addition of mechanisms within the power transmission that require space and also induce a degree of temperature rise to the operation of the power transmission. While all of the fluid mechanisms of the power transmission may not be eliminated, the fluid passages, except for lubrication passages, within the main mechanical components of the power transmission can be eliminated.

The fluid-operated devices of power transmission controls can be supplanted with torque-to-thrust mechanisms such as those shown in U.S. Ser. No. 10/303,245 filed Nov. 25, 2002; U.S. Ser. No. 10/319,957 filed Dec. 16, 2002; and U.S. Ser. No. 10/946,759, filed Sep. 22, 2004, all of which are assigned to the assignee of the present application.

SUMMARY OF THE INVENTION

It is an object of this invention to provide control apparatus for a power transmission employing a plurality of torque-to-thrust mechanisms, which are controlled by electric motors.

In one aspect of the present invention, two electric drive motors are employed to control the operation of at least five torque-to-thrust apparatus.

In another aspect of the present invention, each of the torque-to-thrust apparatus is selectively connectible with both of the drive motors individually through selectively engageable friction devices.

In yet another aspect of the present invention, each of the torque-to-thrust apparatus is selectively held stationary by friction devices.

In yet still another aspect of the present invention, one of the electric motors is operable through selection of the friction devices to enforce the engagement operation of one of the torque-to-thrust apparatus while the other of the electric motors is selectively operable through selective engagement of the friction devices to disengage one of the torque-to-thrust apparatus.

DESCRIPTION OF AN EXEMPLARY EMBODIMENT

Figure 1:
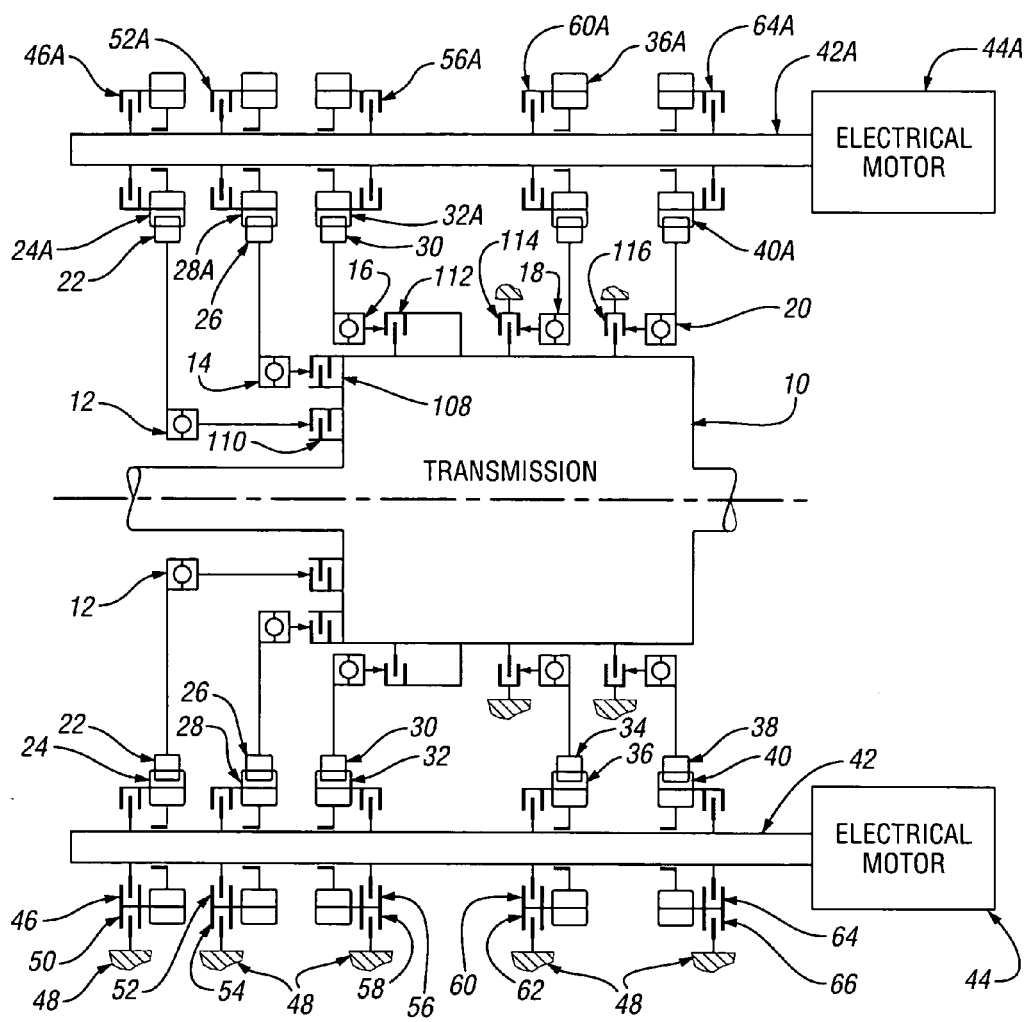
FIG. 1 is a diagrammatic representation of a power transmission employing the control apparatus of the present invention.

As seen in FIG. 1, there is a multi-speed transmission represented by a block 10, which is surrounded by a plurality of torque-to-thrust control apparatus or mechanisms 12, 14, 16, 18, and 20. The torque-to-thrust apparatus 12 includes a rotary input mechanism 22, which is driven by a gear member 24, as seen in FIG. 1. The torque-to-thrust apparatus 14 includes a rotary input mechanism 26, which is driven by a gear member 28. The torque-to-thrust apparatus 16 includes a rotary input mechanism 30, which is driven by a gear member 32. The torque-to-thrust apparatus 18 includes a rotary input mechanism 34, which is driven by a gear member 36. The torque-to-thrust apparatus 20 includes a rotary input mechanism 38, which is driven by a gear member 40.

The gears members 24, 28, 32, 36, and 40 are all rotatably supported on a main shaft 42. The shaft 42 is drivingly connected with a selectively operable electric motor 44. The electric motor 44 is a conventional electric drive device, which can be controlled for clockwise and counterclockwise rotation. Such mechanisms are well known in the art.

The gear member 24 is selectively connectible with the shaft 42 by a conventional selectively operated or solenoid-controlled clutch 46. The gear member 24 can be selectively engaged or restrained by a stationary housing 48 through a conventional solenoid or electrically operated brake apparatus 50.

The gear member 28 is selectively connectible with the shaft 42 through a selectively engageable clutch 52 and with the housing 48 through a selectively engageable brake 54. The gear member 32 is selectively connectible with the shaft 42 through a selectively engageable clutch mechanism 56 and with the housing 48 through a selectively engageable brake member 58. The gear member 36 is selectively connectible with the shaft 42 through a clutch member 60 and selectively connectible with the housing 48 through a brake member 62. The gear member 40 is selectively connectible with the shaft 42 through a clutch apparatus or mechanism 64 and selectively connectible with the housing 48 through a conventional brake apparatus 66.

The rotary input mechanisms 22, 26, 30, 34, and 38 are also engaged by respective gears 24A, 28A, 32A, 36A, and 40A. These gears are selectively connectible with a shaft 42A, which is driven by a conventional electric motor 44A.

The gear member 24A is selectively connectible through a clutch 46A with the shaft 42A. The gear member 28A is selectively connectible with the shaft 42A through a selectively engageable clutch 52A. The gear member 32A is selectively connectible with the shaft 42A through a selectively engageable clutch 56A. The gear member 36A is selectively connectible with the shaft 42A through a clutch 60A. The gear member 40A is selectively connectible with the shaft 42A through a selectively engageable clutch 64A.

Figure 2:
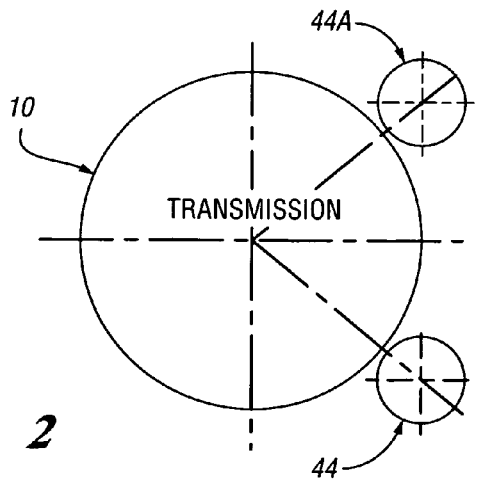
FIG. 2 is a view taken along line 2—2 of FIG. 1.

The systems operated by the motors 44 and 44A are substantially identical and are not necessarily spaced as shown schematically on opposite sides of the transmission block 10 but rather spaced on one side of the transmission and as shown in FIG. 2. The electric motor 44 is operable to selectively control one of the torque-to-thrust apparatus through the engagement of the appropriate clutch member such that the torque-to-thrust apparatus can be rotated by the motor 44. Each of the torque-to-thrust apparatus is also selectively controlled or operable by the electric motor 44A through the engagement of the appropriate clutch apparatus.

During transmission operation, one of the friction devices within the transmission will be engaged while another is being disengaged. The electric motor 44 will control one of the friction members within the transmission while the electric motor 44A controls another of the friction devices within the transmission.

Figure 3:
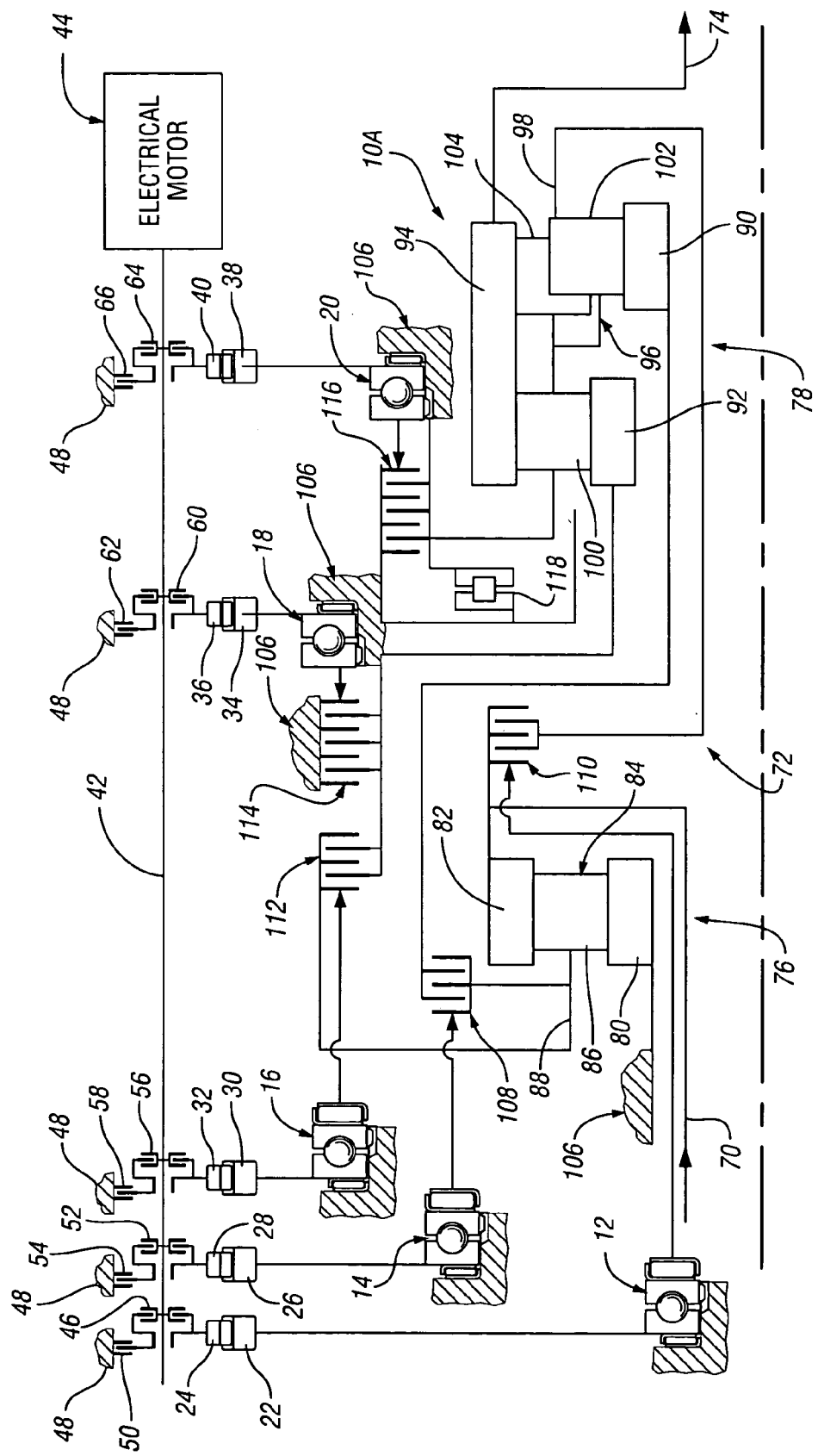
FIG. 3 is a schematic representation of a power transmission employing the control apparatus of the present invention.

There is shown in FIG. 3 a power transmission 10A having an input shaft 70, a planetary gear arrangement 72, and an output shaft 74. The planetary gear arrangement 72 includes a first simple planetary gearset 76 and a Ravigneaux gearset 78.

The planetary gearset 76 includes a sun gear member 80, a ring gear member 82, and a planet carrier assembly member 84. The planet carrier assembly member 84 includes a plurality of pinion gear members 86 that are rotatably mounted on a planet carrier member 88 and disposed in meshing relationship with both the sun gear member 80 and the ring gear member 82.

The Ravigneaux gearset 78 includes two sun gear members 90 and 92, a ring gear member 94, and a planet carrier assembly member 96. The planet carrier assembly member 96 includes a planet carrier member 98 on which is mounted a plurality of pinion gears 100 disposed in meshing relationship with both the sun gear member 92 and the ring gear member 94, and a plurality of intermeshing pinion gear members 102 and 104 that are rotatably disposed thereon and meshing with the sun gear member 90 and the ring gear member 94, respectively. The planetary gear arrangement 72, as shown in FIG. 3, is well known.

The sun gear member 80 is continuously connected with a transmission housing 106. The ring gear member 82 is continuously connected with the input shaft 70. The planet carrier member 88 is selectively connectible through a friction device such as a clutch 108 with the sun gear member 90. The input shaft 70 is selectively connectible through a friction device such as a selectively engageable clutch 110 to the planet carrier member 98. The planet carrier member 88 is also selectively connectible with the sun gear member 92 through a conventional friction clutch 112 and selectively connectible with the transmission housing 106 through a selectively engageable friction brake 114. The planet carrier member 98 is selectively connectible with the transmission housing 106 through a selectively engageable friction brake 116 and also selectively connectible with the transmission housing 106 through a one-way torque-transmitting mechanism 118.

The clutches and brakes of the power transmission 10A are manipulated or engaged in combinations of two to establish six forward speed ratios and one reverse speed ratio between the input shaft 70 and the output shaft 74.

To establish the first or lowest forward speed ratio, the clutch 108 is engaged and either the one-way torque-transmitting mechanism 118 provides the action or the brake 116 is engaged to provide the action. To establish the second forward speed ratio, the clutch 108 is engaged and the brake 114 is engaged while the brake 116 is disengaged and the mechanism 118 is in an overrun condition. To establish the third forward speed ratio, the clutch 108 is engaged and the clutch 112 is engaged while the brake 114 is disengaged.

To establish the fourth forward speed ratio, the clutch 108 is engaged and the clutch 110 is engaged while the clutch 112 is disengaged. To establish the fifth forward speed ratio, the clutch 110 is engaged and the clutch 112 is engaged while the clutch 108 is disengaged. To establish the sixth forward speed ratio, the clutch 110 is engaged and the brake 114 is engaged while the clutch 112 is disengaged. The reverse speed ratio is established with the engagement of the clutch 112 and the brake 116. The clutches and brakes that are not operating in a specific gear ratio are disengaged.

The engagement and disengagement of the clutch 108 is controlled by the torque-to-thrust mechanism 14. The engagement and disengagement of the clutch 110 is controlled by the torque-to-thrust mechanism 12. The engagement and disengagement of the clutch 112 is controlled by the torque-to-thrust mechanism 16. The engagement and disengagement of the brake 114 is controlled by the torque-to-thrust mechanism 18. The engagement and disengagement of the brake 116 is controlled by the torque-to-thrust mechanism 20.

The torque-to-thrust apparatus may take the structure of those described in U.S. Ser. No. 10/303,245 filed Nov. 25, 2002; U.S. Ser. No. 10/319,957 filed Dec. 16, 2002; and U.S. Ser. No. 10/946,759, filed Sep. 22, 2004, all of which are assigned to the assignee of the present application.

As is well known with torque-to-thrust apparatus, when the input portion of the torque-to-thrust apparatus is rotated, the output portion can move axially to apply a thrust force to whatever mechanism is desired to be operated. To engage the clutch 108, the clutch 52 is engaged such that the electric motor 44 is connected to drive the rotary member 26 through the gear member 28. To engage the clutch 108, the electric motor 44 is rotated and therefore the rotary input mechanism 26 is rotated resulting in axial movement of the output portion of the torque-to-thrust mechanism 14. This will enforce engagement of the clutch 108.

The brake member 116 is controlled in engagement by the torque-to-thrust mechanism 20. In order to operate the torque-to-thrust mechanism 20, the electric motor 44A is connected with the gear 40A through the clutch mechanism 64A. The electric motor 44A is rotated to cause engagement of the brake 116. When the clutch 108 and brake 116 has been fully engaged the respective rotary devices, which cause that engagement will be maintained stationary by the engagement of their respective brake mechanisms. For example, the clutch 108 is held in engagement by the engagement of the brake 54, which prevents rotation of the rotary input mechanism 26. The torque-to-thrust mechanism 20 is retained in its engaged position by the engagement of the brake 66.

When the establishment of the first forward speed ratio has been accomplished, the electric motors 44 and 44A and their respective shafts 42 and 42A are disconnected from the gear members. Thus, the motors can both be manipulated or operated to control the upshift from first to second. During the upshift from first to second, the clutch 108 remains engaged, the brake mechanism 116 is disengaged and the brake 114 is engaged. Since the clutch 108 no longer needs assistance of either of the electric motors, the electric motor 44 through the engagement of the clutch 60 can control the torque-to-thrust mechanism 18 to thereby control engagement of the brake 114.

During engagement of the brake 114, the brakes 66 and 116 are disengaged by the engagement of the clutch 64A and the rotary motion of the motor 44A. The motor 44A will be rotated in the direction opposite that which was employed during the engagement of the brake 116. After completion of the one-to-two ratio or 1–2 interchange, the brake 62 is engaged and the clutch 60 is disengaged to maintain engagement of clutch 114. Also, when the brake 116 has been fully disengaged, the clutch 64 is disengaged.

The second-to-third or 2–3 ratio interchange is accomplished with the disengagement of the brake 114 and the engagement of the clutch 112. The brake 114 can be disengaged through the control of the torque-to-thrust mechanism 18 by engaging the clutch 60, disengaging the brake 62, and rotating the electric motor 44 in a direction opposite that of engagement. The clutch 112 is controlled through the torque-to-thrust mechanism 16, which is controlled by the electric motor 44A through the clutch 56A and gear member 28A. Upon the completion of the ratio interchange, that is the full engagement of clutch 112 and disengagement of brake 114, the brake 58 is engaged to ensure the continued engagement of the clutch 116 and the shaft 42 is disengaged from the rotary input mechanism 34 through the disengagement of the clutch 60.

To accomplish a third-to-fourth or 3–4 ratio interchange, the clutch 112 is disengaged while the clutch 110 is engaged. The disengagement of the clutch 112 is controlled by the electric motor 44A through the engagement of the clutch 56A and disengagement of the brake 58, and the engagement of the clutch 110 is controlled by the torque-to-thrust mechanism 12 through the engagement of the clutch 46 and the rotation of the electric motor 44. When the 3–4 interchange has been completed, the brake 50 is engaged to retain the thrust on the torque-to-thrust mechanism 12 and the clutch 56A is disengaged to permit the shaft 42A to be freed. Also, the clutch 46 is disengaged to permit the shaft 42 to be freed.

It should here be noted that the clutch 108 was retained in engagement during the first four forward speeds but will be disengaged during the 4–5 ratio interchange. During the fourth-to-fifth or 4–5 ratio interchange, the clutch 52 is engaged permitting the electric motor 44 to operate the torque-to-thrust mechanism 14 and control disengagement of the clutch 108. The clutch 56A is engaged to permit the electric motor 44A to control the engagement of the clutch 112. When the clutch 52 is engaged, the brake 54 is disengaged. Upon the completion of this ratio interchange, the brake 58 is engaged and the brake 50 remains engaged.

To accomplish a fifth-to-sixth or 5–6 ratio interchange, the electric motor 44A is selectively connected with the rotary input mechanism 30 through the engagement of the clutch 56 such that the torque-to-thrust mechanism 16 can be operated to disengage the clutch 112. When the clutch 56A is engaged, the clutch 58 is disengaged. Also during the 5–6 interchange, the clutch 60 is engaged to permit the electric motor 44 to control the torque-to-thrust mechanism 18 thereby enforcing engagement of the brake 114. Upon the completion of the 5–6 interchange, the brake 62 is engaged, the clutch 60 is disengaged, and the clutch 56A is disengaged.

To provide the downshift sequence, the devices are operated in the opposite manner. The reverse speed ratio is established with the engagement of the clutch 64 to permit the electric motor 44 to control the torque-to-thrust mechanism 20, and the clutch 56A is engaged to permit the electric motor 44A to control the engagement and disengagement of the clutch 112.

It should be noted that a first forward speed to reverse speed ratio interchange can be accomplished by disengaging the clutch 112 and engaging the clutch 108. This can be accomplished by the electric motor 44 controlling the engagement of the clutch 108 through the shaft 42 and clutch 52, and the disengagement of the clutch 112 through the operation of the clutch 56A and the electric motor 44A. Either of the motors can be controlled to operate any of the shift devices. It should be appreciated though that the motors can be operated in unison to control the interchange of two devices. Thus, the control apparatus shown in the present embodiment is applicable to any of the transmissions which have single transition shifts. That is, only one friction device is on-coming while only one friction device is off-going to control the ratios within the transmission.

This provides a system which is considerably simpler than having an individual electric motor to control each of the torque-to-thrust mechanisms.

In general, the shift procedure would be:
1. Engage the clutch from motor 44, 44A via shaft 42, 42A to the gear to the torque to thrust mechanism of the oncoming clutch and the engage the clutch from motor 44A, 44 via shaft 42A, 42 to the gear to the torque to thrust mechanism of the off going clutch.
2. Increase the torque on motor 44A, 44 to relieve the load on the clutch grounding the torque to thrust mechanism of the off going clutch.
3. Release the clutch that has been grounding the torque to thrust mechanism of the off going clutch.
4. Use controlled rotation of motors 44 and 44A to change the thrusts developed by the torque to thrust mechanism on the oncoming and off going clutches in the desired manner to develop a good shift.
5. Apply the clutch grounding the gear to the torque to thrust mechanism for the oncoming clutch to maintain that oncoming clutch's capacity.
6. Remove all power from motors 44 and 44A.
7. Release the clutches connecting the motors 44 and 44A to the thrust mechanisms.

The clutch mechanisms, which are utilized with the electric motor controls 44 and 44A, are very simple devices having low torque requirements. It is considered that the clutches will require a very small torque capacity, for example, one Newton-meter (Nm) and this same torque capacity is also considered appropriate for the brake mechanisms for the control devices. These devices can be electrically or solenoid-operated mechanisms such that there is no requirement for hydraulic fluid except for perhaps lubrication, which is a very low pressure, low flow operation. The clutch and brake devices utilized with the control mechanisms might also be of the mechanical type, which employ solenoid engagement devices.

What is claimed is:

1. A control apparatus for a power transmission having a plurality of selectively engageable friction devices said control apparatus comprising:
  a torque-to-thrust mechanism for each of said selectively engageable friction devices, each of said torque-to-thrust mechanisms having a rotary input mechanism;
  a first drive means for selectively rotating each of said rotary input mechanisms, said first drive means including a plurality of control input mechanisms adapted to rotate respective ones of said rotary input mechanisms, a first shaft supporting each of said control input mechanisms, selectively engageable clutch means for selectively individually connecting each of said control input mechanisms with said first shaft, selectively engageable brake means for selectively individually connecting each of said control means with a stationary housing, and a first electric motor drivingly connected with said first shaft for selectively rotating said first shaft;
  a second drive means for selectively rotating each of said rotary input mechanisms, said second drive means including a plurality of control input mechanisms adapted to rotate respective ones of said rotary input mechanisms, a second shaft supporting each of said control input mechanisms, selectively engageable clutch means for selectively individually connecting each of said control input mechanisms with said second shaft, and a second electric motor drivingly connected with said second shaft for selectively rotating said second shaft; and said first drive means being operable to control an on-coming one of said selectively engageable friction devices and said second drive means being operable to control an off-going one of said selectively engageable friction devices to accomplish a ratio interchange within said power transmission.

2. The control apparatus for a power transmission having a plurality of selectively engageable friction devices said control apparatus defined in claim 1 further comprising:

said selectively engageable brake means of said first drive means being actuated to restrain rotation of said first drive means and said rotary input mechanism associated therewith at the completion of said ratio interchange.

3. The control apparatus for a power transmission having a plurality of selectively engageable friction devices said control apparatus defined in claim 1 further comprising:

each of said rotary input mechanisms having a gear portion formed at an outer periphery thereof; and each of said control input mechanisms including a gear member formed thereon and disposed in continuous meshing relation with respective ones of said gear portions formed on said rotary input mechanisms.

4. The control apparatus for a power transmission having a plurality of selectively engageable friction devices said control apparatus defined in claim 1 further comprising:

at least five torque-to-thrust mechanisms;

said first drive means including at least five clutch means and five brake means; and said second drive means including at least five clutch means.

5. The control apparatus for a power transmission having a plurality of selectively engageable friction devices said control apparatus defined in claim 2 further comprising:

said plurality of control means of each of said first drive means and said second drive means having common gear members connected to rotate respective ones of said rotary input mechanisms.

* * * * *